April 15, 1941. H. H. CURRY 2,238,627
MARINE DIESEL ELECTRIC PROPULSION PLANT
Filed Oct. 26, 1939 3 Sheets-Sheet 1

WITNESSES:
Leon M. Farman
Wm. J. Ruano

INVENTOR
Herman H. Curry
BY
Paul E. Friedemann
ATTORNEY

April 15, 1941.     H. H. CURRY     2,238,627
MARINE DIESEL ELECTRIC PROPULSION PLANT
Filed Oct. 26, 1939     3 Sheets-Sheet 2
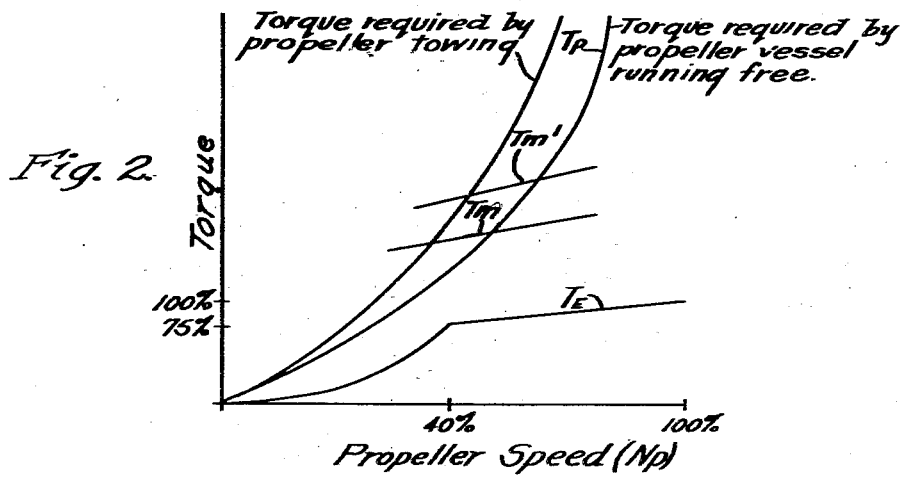
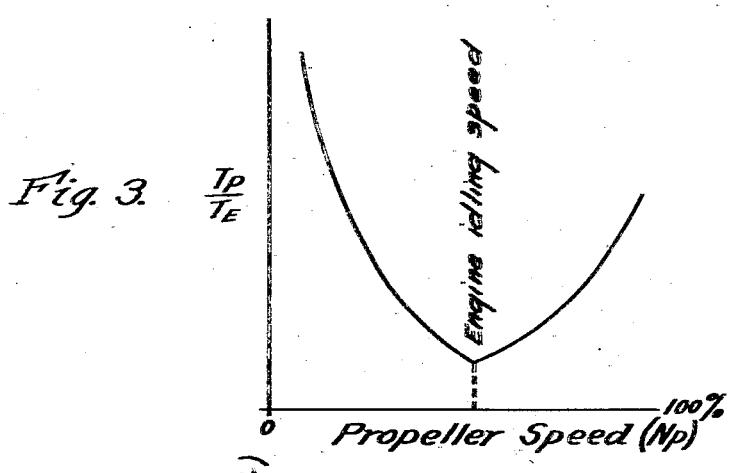
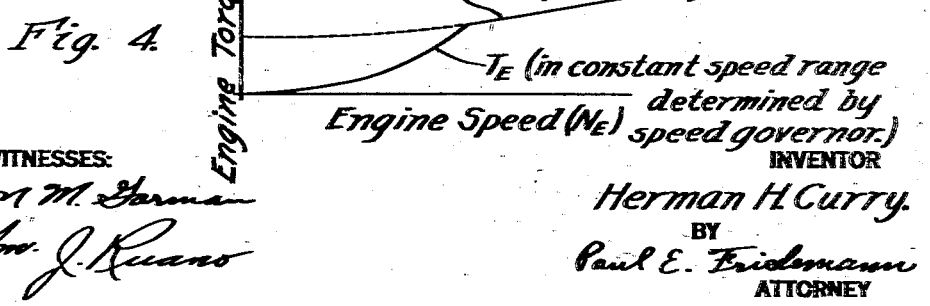
INVENTOR
Herman H Curry.
BY
Paul E. Friedmann
ATTORNEY April 15, 1941.  H. H. CURRY  2,238,627
MARINE DIESEL ELECTRIC PROPULSION PLANT
Filed Oct. 26, 1939    3 Sheets-Sheet 3

WITNESSES:
Leon M. Garman
Wm. J. Ruano

INVENTOR
Herman H. Curry.
BY
Paul E. Friedemann
ATTORNEY

Patented Apr. 15, 1941

2,238,627

UNITED STATES PATENT OFFICE 2,238,627

MARINE DIESEL-ELECTRIC PROPULSION PLANT

Herman H. Curry, Montgomery County, Md., assignor to Westinghouse Electric & Manufacturing Company, East Pittsburgh, Pa., a corporation of Pennsylvania Application October 26, 1939, Serial No. 301,426

10 Claims. (Cl. 290—4)

My invention relates to a drive which is particularly suitable for marine use for driving a propeller for causing motion of a ship and it is more specifically directed to a marine Diesel-electric propulsion system in which means are provided for automatically controlling the speed of the Diesel engines and for maintaining the speeds of the engines as low as possible for all values of power demanded by the propeller under various load conditions. By maintaining the speed of the Diesel engines as low as possible in all situations, excessive wear of the engines will be avoided, noise and vibration reduced, the engines will have a materially prolonged life and fuel and oil consumption materially reduced.

In the past, it has been customary in Diesel-electric propulsion systems to have the Diesel engines run at a fixed speed for a variety of different values of power demand of the propeller under various load conditions. In many situations, this fixed speed was much higher than necessary with respect to the power demand of the load, with the result of excessive wear of the Diesel engine. Attempts have been made to operate the Diesel engines at more than one fixed speed for various load conditions by manually operated means. However, as the number of fixed speed points are increased, the control system becomes more and more complicated and to such an extent as to become cumbersome and expensive. Furthermore, since the determination of the particular speed at which the engine is to run is one which is at the discretion of the operator, the human element of error enters and oftentimes the engine is run at speeds other than the lowest optimum speed.

An object of my invention is to provide a marine Diesel-electric propulsion system in which the speed of the Diesel engine is automatically controlled in accordance with the power demand on the propeller under various load conditions.

Another object of my invention is to provide a marine Diesel-electric propulsion system in which the speed of the various Diesel engines is kept at an optimum minimum value for all conditions of load on the propeller.

Another object of my invention is to provide a control system for a marine Diesel-electric propulsion apparatus which is light, simple and inexpensive, but which is reliable in operation.

Other objects and advantages will become more apparent from a study of the following specification when considered in conjunction with the accompanying drawings, in which:

Figs. 2, 3 and 4 show a number of curves indicating various characteristics of certain elements of the system;

Figure 1:
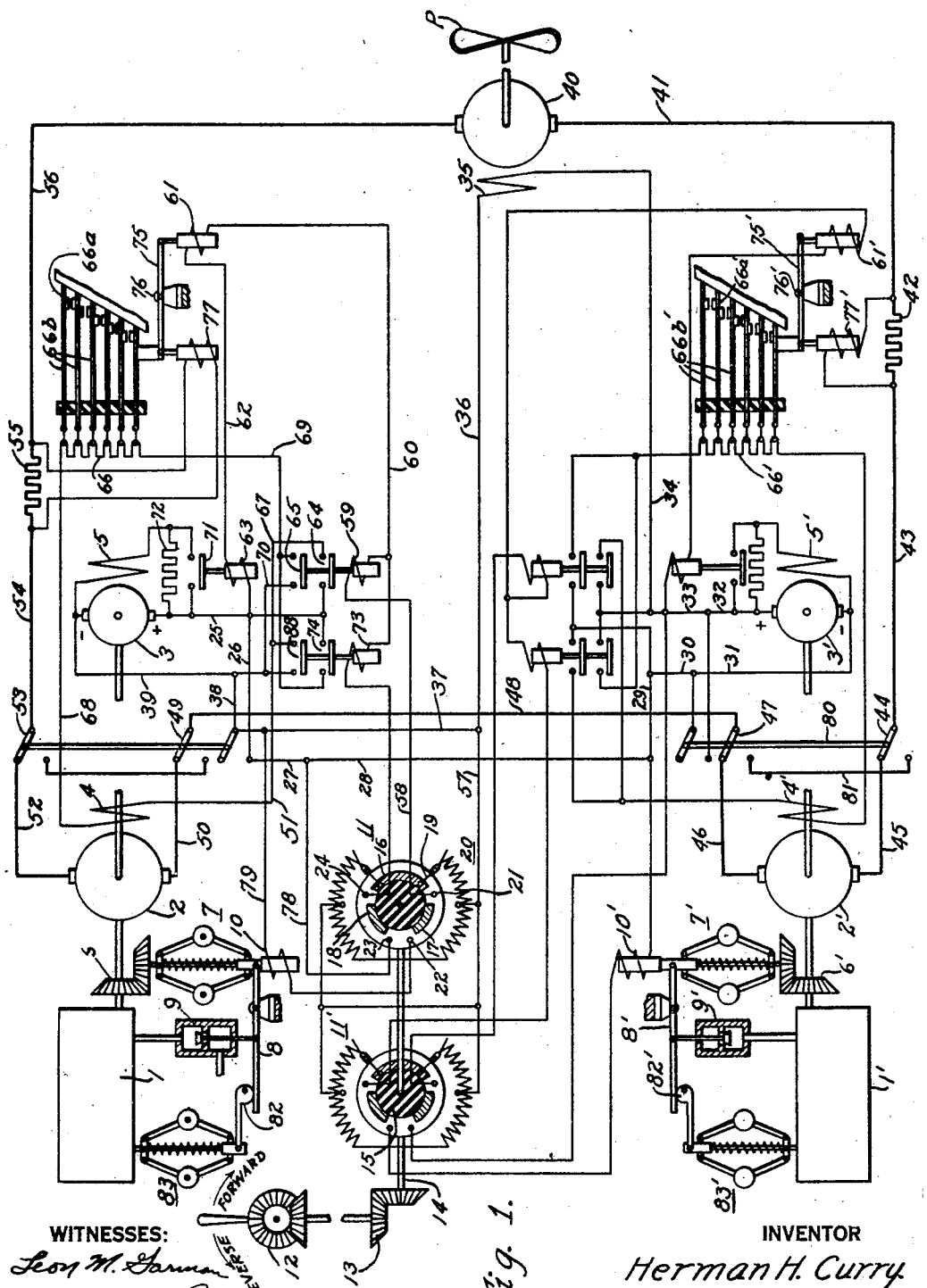
Figure 1 is a schematic showing of a marine Diesel-electric propulsion system embodying the principles of my invention.

Referring more particularly to Figure 1, reference numeral 1 denotes a driving engine which may be a Diesel engine or any other type of internal combustion engine. Engine 1 is coupled to armature 2 of a generator and to an armature 3 of an exciter. The generator is separately excited by a field winding 4 and the exciter may be either self or separately excited but is shown as being self-excited by winding 5. Engine 1 also drives through a pair of beveled gears 6, a governor 7 which operates a lever 8 which, in turn may adjust the point of cutoff of the fuel pump to vary the amount of fuel per working stroke of engine. Governor 7 may be set to a minimum idling speed and also, by energizing solenoid 10, to one or more higher speeds. The maximum amount of fuel per stroke that can be supplied is limited by a stop or by a fuel limiting cam 82 operated by a fuel limiting governor 83, thus limiting the engine torque as a definite function of engine speed. A definite maximum value of engine torque and engine speed will be determined by the setting or adjustment of the governors 7 and 83. A desirable method of operating the engine is shown in the curves of Fig. 2. Referring to the engine torque curve, it will be observed that the engine torque limit varies along a straight line from 100% at 100% engine speed to 75% at a minimum engine idling speed of 40%. Below idling speed, control will function as a conventional Ward Leonard system with constant motor excitation and the propeller speed can be controlled by varying the generator field with the engine speed held constant by the engine speed governor. This is illustrated by the descending portion of the curve in Fig. 3.

At propeller speeds requiring power such that the engine must operate above idling speed, the engine speed will be controlled by the generator torque determined by the ratio of generator and motor fields (see the ascending portion of the curve in Fig. 3) with the engine speed governor set to a somewhat higher speed and the engine operating along the brake mean effective pressure-speed (BMEP—RPM) curve determined by the fuel limiting cam. As will be hereinafter seen, when the power demand of the propeller becomes so high as to necessitate more than idling speed of the engine, coil 10 will become energized and will exert more and more pull due to increased energization thereof as the power demands of the propeller require higher and higher engine speeds. It will be observed that the effect of energized coil 10 is cumulative with respect to the spring of the governor. That is, it tends to keep the flyballs of the governor from moving outwardly thereby restraining closing movement of the valve 9. (Valve 9 is symbolic of any method of varying fuel per stroke as by varying the point of cutoff of a fuel injection pump.)

A manually operable controller 11 serves as a means for controlling the direction of rotation of the propeller P as well as to selectively vary the speed thereof, as will hereinafter appear. In Fig. 1, two driving units are shown, each comprising, essentially, a Diesel engine, a generator, an exciter and a controller. The driving unit together with its associated elements, which is located in the lower half of Fig. 1, is identical with the driving unit and its associated elements appearing in the upper half of Fig. 1. Hence all such identical elements in the lower part of Fig. 1 are denoted by the prime of the numerals used to designate the elements in the upper half of the figure. For example, numerals 1', 2' and 3' of the lower driving unit correspond to the elements indicated by numerals 1, 2 and 3 of the upper driving unit, etc. For this reason, it is deemed an explanation of the elements of the upper driving unit will be sufficient.

Exciter armatures 3 and 3' are connected in series with the propulsion motor field winding 35. The circuit can be traced from the terminal marked plus on exciter 3 through conductors 25, 26, 27, 28, 29, 30, 31 through the armature exciter 3', conductors 32, 33, 34 to the field winding 35 of the propulsion motor, conductor 36, conductors 37, 38 and 39 to the negative pole of the exciter 3. In other words, exciter 3, exciter 3' and the field winding 35 of the propulsion motor are connected in series, so that the combined voltage of the exciters is applied across conductors 34 and 36. Likewise, the armatures of generator 2 and generator 2' are connected in series with the armature 40 of the propulsion motor which series connection may be traced from the lower terminal of armature 40 through conductor 41, resistor 42, conductor 43, the bridge contact member of switch 44, conductor 45, generator 2', conductor 46, bridge contact members of switch 47, conductor 48, the bridge contact members of switch 49, conductor 50, armature 2, conductor 52, bridge contact members of switch 53, conductor 54, resistor 55 and conductor 56 to the upper terminal of the armature 40.

The operation of the upper driving unit is as follows: Assume that it is desired to drive the ship in a "forward" direction. The operator then manually rotates control lever 12 in a clockwise (that is, the forward direction), thereby driving a system of beveled gears 13 which, in turn, drive a drive shaft 14 in a clockwise direction. Coupled to drive shaft 14 are the movable elements of the two controllers 11 and 11'. Referring more particularly to controller 11, which is the controller for the upper driving unit, an insulating disk 15 is coupled to shaft 14 and is rotatable in a clockwise direction as the result of the aforesaid movement of control lever 12. Three arcuate contact segments 16, 17 and 18 are mounted on the periphery of insulating disk 15. Mounted on segment 16 is a slidable contact arm 19 of a variable resistor 20. Stationary contact members 21, 22, 23 and 24 are provided on the controller 11. As the arcuate contact segment 16 moves clockwise, it will come in contact with the stationary contact member 21, thus completing a circuit from the (—) terminal conductor of exciter 3 through conductors 39, 38, 37, 57, a portion of the variable resistor 20, contact arm 19, stationary contact member 21, conductor 58, the actuating coil of forward directional contactor 59, conductor 60, biasing coil 61, conductor 62, coil 63, conductor 25 to the opposite or (+) terminal of the combined voltages exciter armature 3. The completion of the aforesaid circuit effects operation of contactor 59 to close contact members 64 and 65, which contact members are effective to connect the exciter 3 in series with the generator field 4 and the variable resistor or "silverstat" 66. The circuit for 66 may be traced from the positive terminal of exciter 3 through conductor 25, contact member 64, conductor 67, the field winding 4, conductor 68, variable resistor 66, conductor 69, bridge contact member 65, conductor 70, to conductor 39 and the negative terminal of the exciter. Energization of coil 63 effects closing of contact members 71 which short circuits a resistor 72, the effect of which is to increase the exciter field at all positions of controller 11, except the "off" or "stop" position (that is, the position shown in the drawings).

If it is desired to run the propeller P in the reverse direction, control lever 12 is rotated counterclockwise which effects counterclockwise movement of the contact segments 16, 17 and 18 of controller 11. When contact segment 16 engages the stationary contact member 24, the circuit will be established for energizing the actuating coil of the reverse directional contactor 73, which effects closure of contact members 74 and 88, which, in turn, complete a series circuit from exciter 3 through the variable resistor 66 and the generator field winding 4. This circuit may be traced from the positive terminal of exciter 3 through conductor 25, bridge contact members 74, conductor 69, variable resistor 66, conductor 68, field winding 4, conductor 51, bridged contact members 88, conductor 39 to the negative terminal of the exciter. In other words, the exciter will energize the field winding for the generator with an opposite polarity than that for the "forward" direction of movement.

Variable resistor 66 is operated by a plurality of bridging contact members 66a which are supported by a plurality of flexible metallic members 66b, which may be of silver or any other suitable material and for this reason is often referred to as being a "silverstat." The contact members 66a are caused to progressively close by virtue of a clockwise movement of the differentially operated armature 75 moving about a pivot 76. It will be noted that there are two oppositely acting biasing means, namely coils 77 and 61, coil 77 is energized by an amount which is proportional to the current flowing through resistor 55 which, in turn, is in the series circuit including the propulsion motor armature and the armatures of the generators when both driving units are in operation. Coil 77 tends to move armature 75 in a counterclockwise direction thereby progressively relieving the pressure on the contact members 66a, therefore tending to insert more resistance of the variable resistor 66. Coil 61, on the other hand, tends to move armature 75 in a clockwise direction, thereby progressively effecting contact of the contact members 66a thus effecting a progressive shunting of the resistance of variable resistor 66. The current through coil 61 thus varies as a function of the value of the exciter voltages $E_1$ and varies also as a function of the setting of controller 11. The voltage of both exciters varies as a function of engine speed. The voltage applied to the main motor is a function of both engine speed and the value of variable resistor 66. It will be noted that coil 61 is shown as controlled through controller 11 by the voltage of exciter armature 3, while another modification is shown in the lower part of Fig. 1 illustrated by 3'—11' and 61' where the operating voltage is the combined voltage of exciter armatures 3 and 3'.

Upon a predetermined movement in either direction of controller 11, the stationary contact members 22 and 23 will be bridged either by contact segment 17 or contact segment 18, the effect of which is to complete a circuit through coil 10 and exciter 3. This circuit may be traced from the positive terminal of exciter 3 through conductors 25, 26, 27 and 78, the bridging contact members 22 and 23, coil 10, conductors 79, 38 and 39 to the negative terminal of the exciter. The effect of energization of coil 10, as explained heretofore, is to change the speed setting of governor 7, that is, to add to the spring action of the governor so as to restrain the flying out movement of the governor balls and to restrain closure of valve 9, thereby allowing a greater fuel supply and high speed of operation of the engine 1.

If it is desired to drive propeller P by only one of the driving units instead of both, say for example, to have drive only by the upper driving unit, engine 1', is shut down and generator 2' is eliminated from the circuit by throwing switch 80 downwardly and completing a circuit through conductor 81.

In the control system described in Fig. 1, it is essential that the engine torque be limited to an optimum engine torque-speed curve by limiting the amount of fuel per stroke as by limiting the point of cutoff of the fuel pump by a stop or cam 82 or by varying this point to cut off as a function of engine speed. The speed governor 7 will vary the fuel per stroke very rapidly as a function of speed, say from a maximum amount for an engine speed 2% under governor speed setting to no fuel at 2% above this governor speed setting (see Fig. 4). This governor will be set at say 40% of full speed when solenoid 10 is not energized and at full speed when solenoid 10 is energized. The maximum amount of fuel per stroke may be limited by a simple stop if an approximately constant brake mean effective pressure and engine torque above idling speed is desired or limited as by the fuel limiting cam 82 which is operated by the fuel limiting governor 83 to vary the maximum possible amount of fuel per stroke as any desired function of engine speed as determined by configuration of the fuel limiting cam 82 and characteristics of fuel limiting governor 83, say as a straight line from 75% fuel at an idling engine speed of 40% to 100% fuel per stroke at full engine speed.

Now if the engine is so loaded that the engine speed is below that for which the speed governor is set this governor will be attempting to give maximum fuel per stroke and the engine must be operating at some point on the optimum curve of fuel per stroke and thus engine torque speed curve determined by the fuel limiting device 82—83 (see Fig. 4), with engine speed determined by the generator torque which, in turn is determined by the motor (propeller) torque and transmission ratio (which ratio is determined by the ratio of motor and generator excitation).

Figure 5:
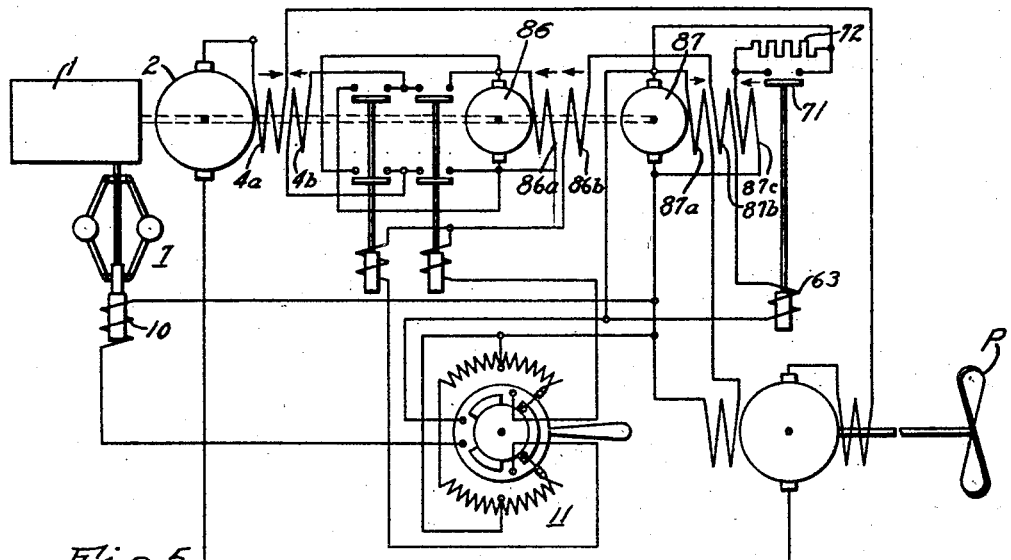
Fig. 5 shows a modification of the exciter circuit used in the device embodying my invention.

With generators and motor (or motors) in series the main armature current is the same in all, and the ratio of that part of motor torque supplied by any one generator and the engine torque supplied to that generator is determined by some constant for a particular design multiplied by the ratio of that part of the motor excitation supplied by the exciter of the particular generator and the excitation of the generator regardless of engine or motor speed. The torque of the generator (Tg) is equal to a constant (Cg) times flux (ϕg) times armature current; motor torque (Tm) is equal to another constant (Cm) times flux (ϕm) times armature current therefore $$\frac{Tm}{Tg} = \frac{Cm\phi m}{Cg\phi g} = C \times \frac{\phi m}{\phi g}$$

where C is the combined characteristics of the motor and generator. This torque ratio is determined by the resistance of the silverstat 66 (Fig. 1) or the value of current in control fields 86b and 87b (Fig. 5).

Referring to Fig. 2 it will be seen that in that part of the power range requiring an engine speed above the lowest practicable idling speed, propeller torque will be increasing approximately as the square of the speed, or in most cases more rapidly than the square. The engine torque as multiplied by the transmission ratio corresponding to any one position of the silverstat will give a curve as Tm, of Fig. 2, of torque available at main motor. If this curve has less slope than that of the propeller torque curve at the point of intersection, operation will be stable at this point where torque available from the motor equals torque required by the propeller. Now suppose the silverstat is changed to increase resistance. This lowers the generator excitation and generator torque and changes the torque transmission ratio so that the torque of the engine is multiplied by a larger factor to determine a new torque available curve as Tm' and the motor speed will increase to that determined by the intersection of propeller torque curve with the new torque available curve.

The action during acceleration might be described as follows: This increase in silverstat resistance reduces the generator field but as the engine speed has not changed, the motor field is constant, the main motor armature current is reduced, motor and generator torque is reduced, engine speed increases which increases motor excitation and also generator excitation and voltage. This increase in engine speed continues until the new stable condition is reached with an increase in motor speed, a greater increase in engine speed, an increase in motor excitation and a smaller increase in generator excitation. Maximum engine speed, generator excitation, motor excitation, and motor speed for any one propeller torque speed curve will be reached at maximum engine power. The particular position of the control at which maximum propeller speed is reached is determined by which propeller-torque curve is being used on a vessel such as a tug or ice breaker where the torque speed curve varies according to operating conditions.

This explanation has assumed that the silverstat resistance can be held constant at any desired point as might be the case if the operating solenoid 61 and bridge control station were supplied from a constant voltage circuit and motor speed had been increased in the torque control range by moving control 12. In the circuit shown in Fig. 1 there would be two additional effects superimposed on the action described. The current coil 77 would in general reduce the increase in speed somewhat as the general design would probably be such that main armature current will remain constant or increase slightly with motor speed through the variable engine speed range to take advantage of the better ventilation at higher speeds. During maneuvering this current coil is to limit excessive peak currents and give short circuit protection. Through the constant engine speed power range current will increase approximately as the square of propeller speed and the effect of the current coil will be greater in requiring considerable change in resistance of the bridge control to cause a given change in propeller speed. The second additional effect is that caused by supplying the control circuit of silverstat from the exciter voltage. This effect is to reduce the change in engine speed if control is not moved but hull resistance changes greatly as in ice breaking. An increase in propeller torque without change in control position, silverstat, or transmission ratio, would momentarily increase the current and cause both engine and propeller speed to decrease until the propeller torque was again equal to the torque available but decreasing engine speed reduces the exciter voltage and thus current through operating coil 61 which effect is cumulative with the increased current in coil 77 which reduces the generator field, changes the transmission ratio and allows the engine speed to increase with a net effect of the motor operating stably at a slightly lower speed with a greater torque transmission ratio to handle the increased propeller torque.

It may be noted that the effects of increasing current in coil 77 and decreasing current in coil 61, due to slower engine speed and thus exciter voltage, are cumulative in decreasing the ratio of generator field to motor field and thus automatically increasing the transmission ratio to furnish greater motor torque as caused by towing or vessel entering ice. This action also prevents stalling of engines by unusually high propeller torque requirements.

The automatic action in changing the transmission ratio of the system shown in Fig. 1 on change of motor torque may be summarized as follows: an increase in torque required increased current and may slow the engine. The cumulative effect of increased motor armature current and reduction in exciter voltage due to decrease of engine speed tends to increase the resistance in the generator field and thus allow the engine speed to increase which increases the motor field. This prevents excessive stalling of the engine during maneuvering, towing, ice breaking and such conditions of higher propeller torque.

Stability of speed between the generator units in the torque control range is provided automatically as an increase in the speed of one engine over that of another increases the excitation of this main generator both directly due to the higher excitation voltage supplied and indirectly by increasing current through coil 77 of its control rheostat which decreases resistance in its excitation circuit. The relatively greater excitation of the higher speed machine increases the torque required from this engine and thus limits changes of speed of the individual units from their mean speed. Conversely a decrease in engine speed unloads that particular unit.

An increase in engine speed and corresponding increase in voltage applied to the motor might be thought to increase the motor speed and thus torque and armature current as about the square of motor speed but in this system the motor field is increased with engine speed in the same way that the voltage applied to motor armature is increased by an increase in engine speed but with a lag due to the inductance of motor field. This gives stable operation.

Figure 6:
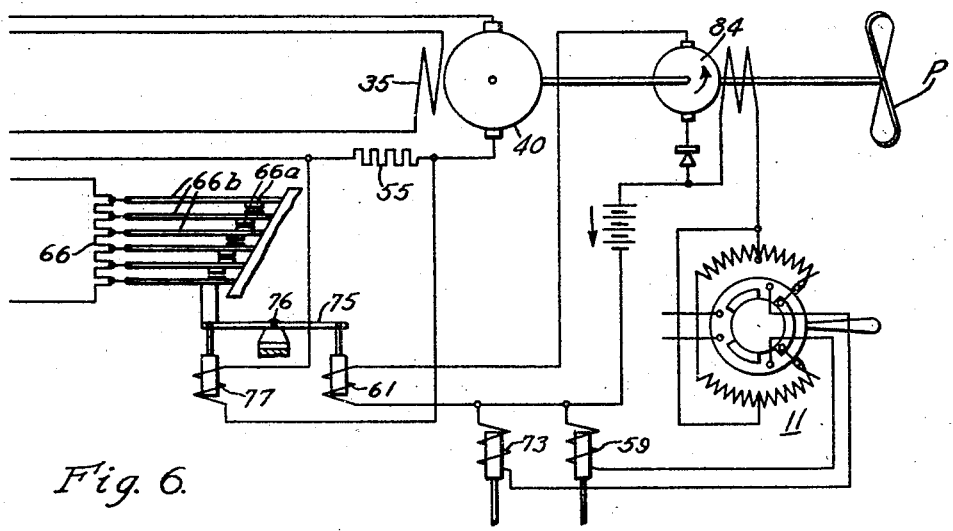
Fig. 6 shows another modification of the exciter circuit used in the device embodying my invention.

For sea-going vessels which operate along a single torque-speed curve where a constant propeller speed on a definite control setting is more desirable the control circuit could be supplied from a constant potential source through pilot generator 84 (see Fig. 6) driven from propeller shaft. This would tend to hold the propeller speed constant and vary the transmission ratio and engine speed with varying torque. In Fig. 6 an element sensitive to speed as generator 84 bucking a fixed voltage such as that of a battery such that a slight increase in speed of generator 84 at constant excitation will cause an appreciable increase in current through coil 61 and thus increase generator excitation which slows engine down and thus reduces voltage applied to motor or conversely a slight reduction in speed of generator 84 will reduce current in coil 61 and decrease generator field which reduces torque required by generator and allows engine speed to increase which increases voltage applied to main motor armature and simultaneously increases excitation of main motor. This could only be used in the torque controlled speed range. The remaining elements are identical with those in Fig. 1 and have been identified by the same reference numerals, hence further explanation is deemed unnecessary. By using the bridge control rheostat to vary the field of this control generator in the torque-controlled speed range and applying a constant counter E. M. F. as shown in Fig. 6 control could be made very sensitive to changes in motor speed.

By arranging this control system to hold a constant but adjustable motor speed by thus automatically varying the transmission ratio while keeping the engine loaded to operate on fuel limiting cam, it would appear well suited for railway and automotive use where it is desired to automatically operate engine under optimum conditions while driving a variable load at a selected speed.

Figure 7:
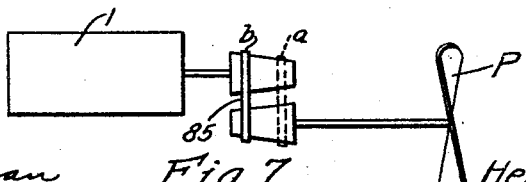
Fig. 7 is a schematic showing illustrating the principles of my invention.

The action of an equivalent mechanical gear may help explain the control of engine speed by varying the torque ratio. In Fig. 7 assume engine 1 is governed to run at 40% speed. Shifting belt 85 from position $a$ to position $b$ will progressively increase the propeller speed and the torque load on the engine but at position $b$ the governor is against the fuel limit cam and the engine torque cannot increase. Obviously further movement of belt to the left will reduce both propeller and engine speed. If, with the belt at position *b*, the speed governor 7 spring tension is increased setting the speed governor for 100% engine speed, no change in speed would result as fuel and engine torque is still limited by the cam stop 82 and with this transmission ratio, propeller torque just equals the torque available. Now with the governor set for 100% engine speed moving the belt back to the right toward position *a* allows the engine speed to increase and increases the propeller speed as the torque available has been increased from T*m* to say T*m'* of Fig. 2 by increasing the torque ratio. Obviously unless the engine first reaches 100% of the speed for which the governor is now set the maximum propeller speed will be reached when the belt is moved back to position *a*. Moving the belt from position *a* to position *b* with the governor set for idling speed corresponds to gradually reducing the resistance of the silverstat and increasing the generator field with constant motor field. Position *b* corresponds to minimum resistance in the generator field with the governor set to full speed. Movement back toward position *a* corresponds to the further movement of the control during which resistance in the generator field is again increased. To repeat, only the ratio of motor to generator field determines the torque ratio and engine speed above idling speed when engine torque is limited. Both generator and motor fields are actually being increased but at different rates during this last part of the movement of the control even though resistance is being added to generator field circuit, as the increased engine speed increases the exciter voltage faster than resistance is added.

A disadvantage of the simple arrangement shown in Fig. 1 is that additional generator field loss is introduced by the silverstat controlled resistance at higher powers. The obvious solution is, of course, to use separate exciters for the motor and generator and control in the field of the generator exciter only or perhaps combine the two exciters into one frame but arrange them to give two voltages. Instead of using the solenoid controlled silverstat the control current could be used directly on the field of the generator exciter or for some optimum engine torque speed curves the control circuit would increase the generator exciter field while reducing motor exciter field as shown in Fig. 5. Referring more particularly to Fig. 5, a generator having field windings 4*a* and 4*b* differentially compounded, and a generator exciter 86 having field windings 86*a* and 86*b* cumulatively compounded are provided in conjunction with a motor exciter 87 having field windings 87*a*, 87*b* and 87*c*. Windings 86*a* and 86*b* are compound windings. Windings 87*a*, 87*b* and 87*c* are also compound windings. The motor control field corresponds to voltage coil 61 of Fig. 1 and is so arranged that an increase of current in this circuit will boost generator exciter excitation and buck motor exciter excitation. An effect similar to that caused by current coil 77 of Fig. 1 is caused by differentially compounding the main generator with main generator current so an increase in motor current causes a decrease in generator excitation. The remaining elements of the circuit are the same as those in Fig. 1 and are identified by the same reference numerals, hence further explanation is deemed unnecessary. Obviously, the same control circuits and systems could be used with the well known "Metadyne" type of exciter or generator.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A marine propulsion system comprising a propeller, a propulsion motor, power means including generator and internal combustion engine means for supplying electrical energy to said motor, electrical control means which is responsive to current flow through said motor for progressively and automatically varying the ratio of field strengths of said motor and generator means, hence the speed of said internal combustion engine means in accordance with variations in power demands of said propeller and for maintaining said speed at an optimum minimum value for all values of power demand of said propeller.

2. A ship propulsion system comprising a propeller, a propulsion motor including an armature and field winding, power means including a generator having an armature and field winding, an internal combustion engine coupled to said generator and an exciter for supplying electrical energy to said motor, field winding, electrical control means which varies as a function of current flow through said motor armature and voltage of said exciter for progressively and automatically varying the speed of said internal combustion engine as a function of power demand of said propeller and for maintaining said speed at an optimum minimum value for all values of power demand of said propeller.

3. A ship propulsion system comprising a propeller, a propulsion motor, power means including an internal combustion engine coupled to a generator, an exciter for supplying electrical energy to said motor, electrical control means for progressively and automatically varying the speed of said internal combustion engine and the ratio of generator and motor field strengths as a function of power demand of said propeller and for maintaining said speed at an optimum minimum value for all values of power demand of said propeller, said last-named means being directly controlled by the torque of said generator which, in turn, is determined by the ratio of generator and motor fields.

4. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armatures of each of said generators being connected in series with said motor armature, the armatures of each of said exciters being connected in series with the field winding of said motor, means differentially energized by the currents in each of said series circuits for progressively varying the speed of said engines in accordance with variations in power demand of said propeller and for maintaining said speed at an optimum minimum value for all values of power demand of said propeller.

5. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armatures of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters, and means connected to each of said exciters and operated by the voltage thereof for varying the speed of the respective internal combustion engine and for maintaining said speed at an optimum minimum value for all values of power demand of said propeller.

6. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armatures of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters, and means connected to each of said exciters and operated by the voltage thereof for varying the speed of the respective internal combustion engine and for maintaining said speed at an optimum minimum value for all values of power demand of said propeller, means for reversing said generator field windings in relation to the respective exciters for reversing the direction of rotation of said propeller.

7. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armatures of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters, a governor associated with each of said engines for controlling the fuel supply thereof and which is adjusted to limit the idling speed of the engine to a predetermined value, electrical means energized by the voltage of each of the exciters for varying the speed limiting adjustment of the respective governor for allowing the respective engine to operate above idling speed, said resistor varying means and said electrical means cooperating to maintain the speed of the respective engine to an optimum minimum value for all values of power demand by said propeller.

8. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armature of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters, a governor associated with each of said engines for controlling the fuel supply thereof and which is adjusted to limit the idling speed of the engine to a predetermined value, electrical means energized by the voltage of each of the exciters for varying the speed limiting adjustment of the respective governor for allowing the respective engine to operate above idling speed, said resistor varying means and said electrical means cooperating to maintain the speed of the respective engine to an optimum minimum value for all values of power demand by said propeller, means for reversing said generator field winding in relation to the respective exciters for reversing the direction of rotation of said propeller.

9. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armatures of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters limited by a manually adjustable resistor in circuit relation therewith, which manually adjustable resistor is effective to select any desired torque ratio between engine and propeller, which torque ratio for any one propeller torque curve determines a corresponding propeller speed.

10. A ship propulsion system comprising a propeller, a propulsion motor including an armature and a field winding for driving said propeller and a plurality of driving units for furnishing electrical energy to said motor, each driving unit comprising an internal combustion engine coupled to a generator and an exciter; the armature of each of said generators being connected in series with said motor armature, the armatures of each of said exciters being connected in series with the field winding of said motor, each of said generators being separately excited by a generator field winding which in turn is connected in series with a variable resistor and the exciter coupled to the respective generator; means for varying said last-named resistor comprising an armature biased in opposite directions by a pair of magnet coils, one of which coils is energized by current through said first-mentioned series circuit and the other of which is energized by the terminal voltage across said series of exciters limited by a manually adjustable resistor in circuit relation therewith, which manually adjustable resistor is effective to select any desired propeller speed, a manually operated lever means which is movable in opposite directions to connect the respective exciters to their respective generator fields in one direction or another depending upon whether forward or reverse operation of said propeller is desired, said manually operated lever, upon continued movement in either direction, being effective to vary said manually adjustable resistor and to connect said electrical means for varying the speed adjustment of the governor in circuit relationship with the respective exciter.

HERMAN H. CURRY.